Jan. 7, 1958
M. FREJACQUES
2,819,154
APPARATUS FOR PRODUCING CRYSTALLINE MATERIALS
Filed Dec. 11, 1953
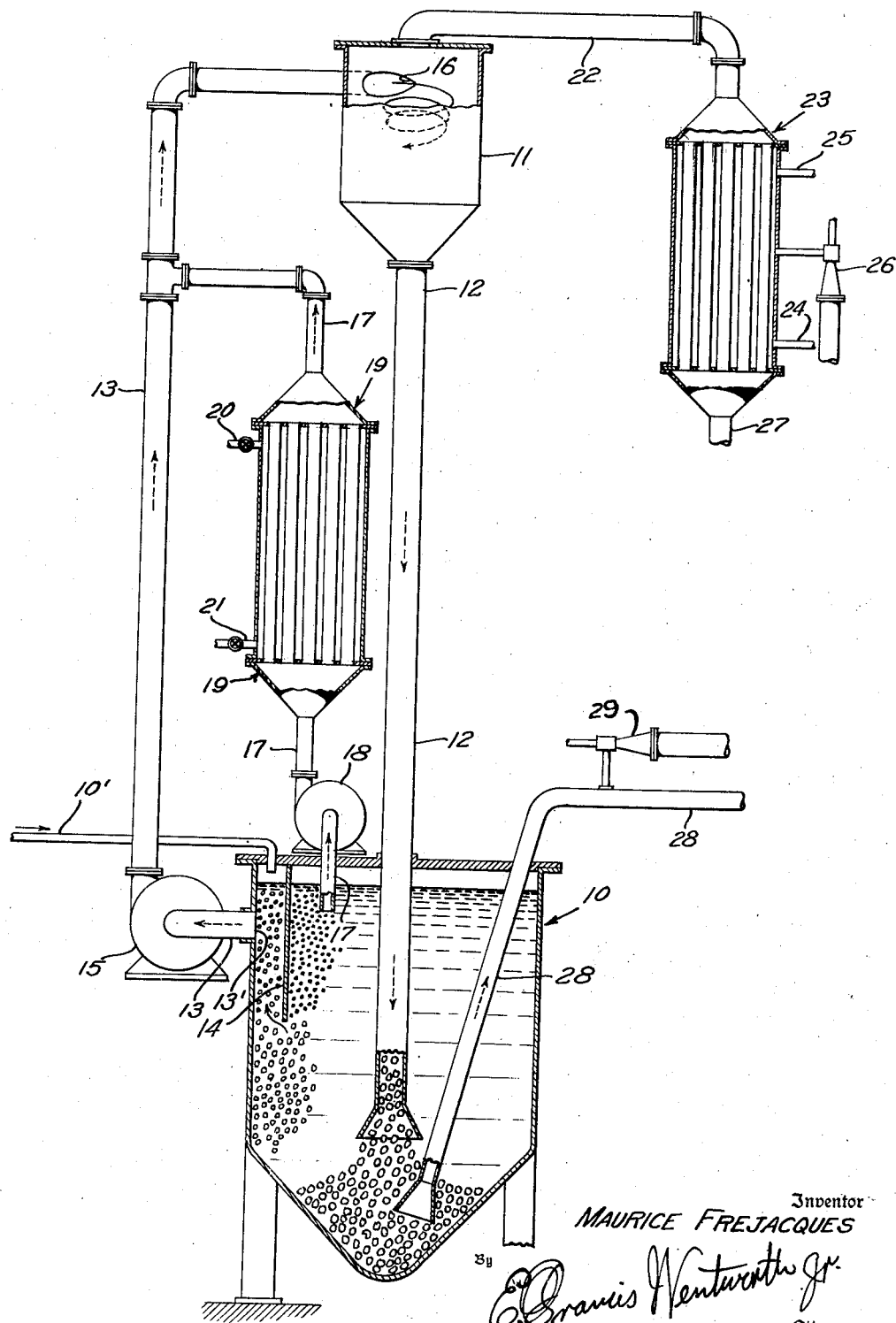
Inventor
MAURICE FREJACQUES
By E. Francis Wentworth Jr.
Attorney

United States Patent Office 2,819,154
Patented Jan. 7, 1958

2,819,154

APPARATUS FOR PRODUCING CRYSTALLINE MATERIALS

Maurice Frejacques, St. Hilaire, Paris, France, assignor to Foster Wheeler Corporation, New York, N. Y., a corporation of New York Application December 11, 1953, Serial No. 397,725

2 Claims. (Cl. 23—273)

The present invention relates to apparatus for and a method of crystallization of substances and more particularly relates to crystallization of relatively large crystals from such substances.

In a conventional crystallization system, a mother liquor solution containing a substance to be crystallized, for example, ammonium nitrate or urea, is introduced into a crystallizer vessel or zone from a source of supply. The mother liquor is furnished from an outside source with the heat necessary for evaporation of the solution to precipitate or form crystals. The solution is thereafter passed through a main circulation line to an evaporation zone or evaporator. The evaporator is maintained under sufficient vacuum to cause boiling of the solution, and removal of the solvent in the form of vapor, to provide a supersaturated solution with respect to the material to be crystallized. The supersaturated solution is thereafter passed to the crystallizer tank wherein crystals are pricipitated or grown from the solution by contacting previously formed crystals in the mother liquor, the solution thereby losing its supersaturation. The crystals are then removed from the vessel by an ejector or similar means to a centrifuge or separating apparatus for separation from the liquor.

A crystal to be grown from supersaturated solution enlarges or grows around a crystal nucleus in a crystallizer vessel. Since there is a definite weight of dissolved material in a solution with respect to the total weight of the solution, the growing of large crystals is limited by the number of fine crystal nuclei present in the solution. That is, as the number of fine crystal nuclei in the solution increases, the number of large crystals that can be grown decreases, because the weight of material available for growing crystals grows around fine crystals. This only produces medium size crystals. An excessive number of fine crystals automatically eliminates the growing of large crystals. In order to produce large crystals, the number of fine crystal nuclei in the solution must be reduced leaving a substantial number of medium size crystals to permit the weight of material present in the solution due to supersaturation to increase the size of the medium size crystals.

In accordance with the present invention, a portion of the solution containing medium size crystals is passed from a crystallization zone to an evaporation zone. Another portion of solution containing fine crystals is passed from said crystallization zone and joins the portion of solution containing the medium size crystals, after the solution containing fine crystals first passes in heat exchange relationship with heating medium in a heating zone and is heated to dissolve or melt some of the fine crystals. This reduces the number of fine crystals in the solution thereby sharply increasing the material available for growth of large crystals around the medium size crystal nuclei.

The present invention further provides a method and apparatus for supplying the heat necessary for crystallization of a material from a solution while avoiding film type overheating of the solution containing medium size crystals passing from the crystallizer vessel to the evaporator, thereby preventing melting or solution of these larger size crystals.

The present invention also provides a method and apparatus for utilizing heat supplied to the portion of solution containing fine crystals for use directly in the evaporator.

A still further provision of the present invention is a flexible adjustment of the heat input to the system.

In accordance with the present invention, a method and apparatus for growing large crystals from a solution containing material to be crystallized is provided, in which a portion of solution containing fine crystals removed from the crystallization zone is immediately introduced to the evaporation zone thereby stabilizing liquid levels and eliminating sensitive liquid level controls and an intermediate melting tank.

The invention will be understood from the following description when considered in connection with the accompanying drawing, in which the single figure shows a flow diagram of the apparatus of the present invention.

Referring to the drawing, reference numeral 10 designates a crystallizer vessel or tank in communication with an evaporator 11 through a barometric leg 12 and a main circulation line or conduit 13. Barometric leg 12 is substantially vertical and extends from the lower portion of the evaporator downwardly into tank 10 to a point near the bottom thereof. The barometric leg permits the operation of tank 10 at atmospheric pressure and above. Conduit 13 is connected at one end to tank 10 through an outlet 13' disposed in the upper portion or level thereof and at the other or opposite end to evaporator 11 through a tangential inlet 16 in the upper portion thereof to permit separation of vapor and liquid without entrainment of the liquid, as hereinafter described. A main circulating pump 15 is disposed in conduit 13 adjacent the end thereof connected to the tank to pump liquid from tank 10 through tangential inlet 16 into evaporator 11. A vertical baffle 14 is disposed in tank 10 in spaced relationship with conduit outlet 13'. Baffle 14 extends downwardly in tank 10 from the top thereof to a point substantially below outlet 13' into the liquid level therein containing medium size crystals, and extends horizontally between the opposite walls of the tank so that liquid or solution containing only medium size crystals will flow from the tank into conduit 13 when pump 15 is in operation. Mother liquor or feed liquid containing material to be crystallized is supplied to tank 10 through a feed conduit 10' disposed in the top thereof adjacent outlet 13' on the same side of baffle 14 as the outlet.

Another circulation line or conduit 17, for passing solution containing fine crystals therethrough, is connected at one end thereof to tank 10 and at its opposite end to conduit 13 on the discharge side of pump 15 disposed therein. Conduit 17 enters tank 10 in the upper level thereof and on the opposite side of baffle 14 from the outlet 13' in communication with the liquid level in the tank containing fine crystals only. Conduit 17 has a circulator pump 18 disposed therein for pumping liquid from tank 10 to conduit 13 and is further provided with a heat exchanger 19 having heating medium inlet and outlet connections 20 and 21, respectively, to supply heat to melt fine crystals in the liquid before the liquid enters conduit 13 and joins the solution flowing therethrough.

Evaporator 11 is maintained under sufficient vacuum by a line 22 connected to a condenser 23 to cause boiling of the liquid or solution passed thereto to provide a supersaturated solution with respect to material to be crystallized. Condenser 23 has cooling water inlet and outlet connections 24 and 25, respectively, and a vacuum device 26. Solvent condensed in condenser 23 is removed therefrom through a condensate pipe 27 to a storage tank, not shown, or may be returned to the system, if desired.

Large or mature crystals are removed from the tank through a pipe 28 connected to an ejector 29. Pipe 28 extends downwardly into tank 10 near the bottom thereof below barometric leg 12.

In operation, tank 10 is filled through conduit 10' with a solution of mother liquor or feed stock containing the material to be crystallized. This initial batch of liquor introduced into the tank is also provided with previously formed crystals of medium and fine sizes introduced therein from an outside source, not shown, in order to provide crystal nuclei upon which to grow large crystals as hereinafter described. The heavier weight of the medium size crystals causes them to fall to the lower level in the tank while the light weight fine crystals remain near the upper level of the solution.

A portion of the solution containing medium size crystals is thereafter passed from the tank into conduit 13 and evaporator 11 by pump 15 while another portion of solution containing fine crystals is passed from the upper level of the tank into conduit 17 by pump 18 therein. Baffle 14 which is in front of outlet 13' and extends downwardly in the tank into the liquid level or stratum therein containing only medium size crystals, prevents the pump 15 from taking suction from solution in the tank containing fine crystals.

The solution containing fine crystals flowing through conduit 17, passes through heat exchanger 19 to melt the fine crystals in the solution by passing in heat exchange relationship with a heating medium such as steam passed through the inlet and outlet connections 20 and 21 of the heater. The solution thereafter flows into conduit 13 joining solution containing medium size crystals flowing therein and passes into evaporator 11.

Thus, heater 19 provides heat necessary for crystallization of the mother liquor and reduces the number of fine crystals in the solution which is particularly important when the apparatus is in operation for any appreciable length of time. This is because a crystal grown from a supersaturated solution needs a nucleus to grow around and since there is only a certain weight of material to be crystallized in the solution, compared to the total weight of material and solution, an excessive number of fine crystals in the solution reduces the weight of material in the solution available for growth of large crystals.

In addition, the furnishing of heat to the solution containing fine crystals by heater 19 provides a flexible adjustment of heat input to the system which is used directly in the evaporator; also there is no redissolving of larger size crystals which occurs when heat is applied directly to the larger size crystals. Further, the solution containing fine crystals is removed from the crystallizer tank and is immediately introduced into the evaporator, thereby stabilizing liquid levels and eliminating sensitive liquid level controls and an intermediate melting tank.

Evaporator 11 is maintained under sufficient vacuum through line 22 connected to condenser 23 and vacuum device 26 to cause boiling of the solution to remove the solvent in the form of vapor therefrom and provide a supersaturated solution with respect to the material to be crystallized. It will be noted the solution enters the evaporator through a tangential inlet 16 which permits ready separation of the vapor from the liquid without entrainment of the liquid therein. This is because the heavier liquid is thrown outwardly around the inner preiphery of the internal wall of the evaporator providing a continuous washdown thereof while the lighter vapor passes centrally upwardly in the evaporator and out thereof to the condenser through line 22.

The supersaturated solution thereafter flows down barometric leg 12 into the lower portion of crystallizer tank 10 where the material in the solution is crystallized by contacting crystal nuclei therein and growing around them to form large crystals, the solution thereby losing its supersaturated condition. The large crystals fall to the bottom of the tank due to their heavier weight and are removed through pipe 28 by an ejector 29 or similar means.

Inasmuch as various modifications may be made in the form of the invention herein disclosed and in the location of the parts of the apparatus without departing from the principles thereof, it will be understood that the invention is not to be limited, excepting by the scope of the appended claims.

What is claimed is:

1. Apparatus for growing crystals from a solution containing substance to be crystallized, comprising a crystallizer vessel having solution therein containing levels of different sized crystals, a feed conduit in communication with said vessel and supplying solution thereto containing desirable sized crystal nuclei and undesirable sized crystal nuclei, said crystallizer vessel having an outlet opening therein for passing solution containing crystal nuclei from said vessel, an evaporator, an evaporator inlet conduit communicating at one end with said evaporator and at the other end with the outlet opening of said vessel, baffle means in said vessel extending in a horizontal direction from wall to wall of said vessel and in a vertical direction downwardly from the top of said vessel in spaced relationship with the outlet opening in said vessel, said baffle means extending downwardly to a point below said outlet opening and in spaced relationship with the bottom of said vessel whereby solution containing undesirable sized crystals is prevented from passing into said outlet opening, pump means disposed in said evaporator inlet conduit for withdrawing through said outlet opening in said vessel solution containing desirable sized crystal nuclei and delivering said solution to the evaporator, a heat exchanger, a heat exchanger inlet conduit having one end connected to said heat exchanger and the other end connected to the upper portion of said vessel on the opposite side of said baffle means from said outlet opening, other pump means disposed in said heat exchanger inlet conduit for withdrawing solution containing undesirable sized crystal nuclei from said vessel and delivering said liquid to the heat exchanger, a heat exchanger outlet condut having one end connected to said heat exchanger and the other end connected to said evaporator inlet conduit to deliver heated solution thereto, vacuum means in communication with said evaporator for producing a supersaturated solution therein, a barometric leg having one end connected to the evaporator and the other end extending into the lower portion of the crystallizer vessel for delivering solution from the evaporator to be crystallized, and ejector means in communication with the lower portion of said vessel for removing grown crystals therefrom.

2. Apparatus for growing crystals from a solution containing substance to be crystallized comprising a crystallizer vessel having liquid therein containing levels of different sized crystals, a feed conduit in communication with said vessel in the upper portion and supplying soluton thereto containing desirable and undesirable sized crystal nuclei, said crystallizer vessel having an outlet opening in the upper portion thereof for passing solution containing crystal nuclei from said vessel, an evaporator having a tangential inlet in the upper portion thereof and an outlet in the lower portion thereof, an evaporator inlet conduit having one end in communication with said evaporator inlet and the other end in communication with said outlet opening in the crystallizer vessel, a substantially vertical baffle in said vessel extending in a horizontal direction from wall to wall of said vessel and downwardly from the top of said vessel in spaced relationship with said outlet opening in said vessel, said baffle means extending downwardly to a point below said outlet opening and in spaced relationship with the bottom of said vessel whereby solution containing undesirable sized crystals is prevented from passing into said outlet opening, pump means disposed in said evaporator inlet conduit for withdrawing through said outlet opening in said vessel solution containing desirable size crystal nuclei and delivering said solution to the evaporator, a heat exchanger, a heat exchanger inlet conduit having one end connected to said heat exchanger and the other end extending into the upper portion of said vessel on the opposite side of said vertical baffle from said outlet opening in said vessel, other pump means disposed in said heat exchanger inlet conduit for withdrawing solution containing undesirable sized crystal nuclei from said vessel and delivering said solution to the heat exchanger, a heat exchanger outlet conduit having one end connected to said exchanger and the other end connected to said evaporator to deliver heated solution thereto, vacuum means connected to said evaporator for producing a supersaturated solution therein, a barometric leg having one end connected to said evaporator outlet and the other end extending downwardly into the bottom of said vessel to deliver supersaturated solution into the solution containing desirable sized crystal nuclei, and ejector means extending into the lower portion of said vessel for removing grown crystals therefrom.

References Cited in the file of this patent

UNITED STATES PATENTS

| | | |
|---|---|---|
| 1,478,337 | Isaachsen | Dec. 18, 1923 |
| 1,860,741 | Jeremiassen | May 31, 1932 |
| 2,219,776 | Henderson | Oct. 29, 1940 |
| 2,591,067 | Herrmann | Apr. 1, 1952 |
| 2,648,594 | Olson | Aug. 11, 1953 |